Figure 1:
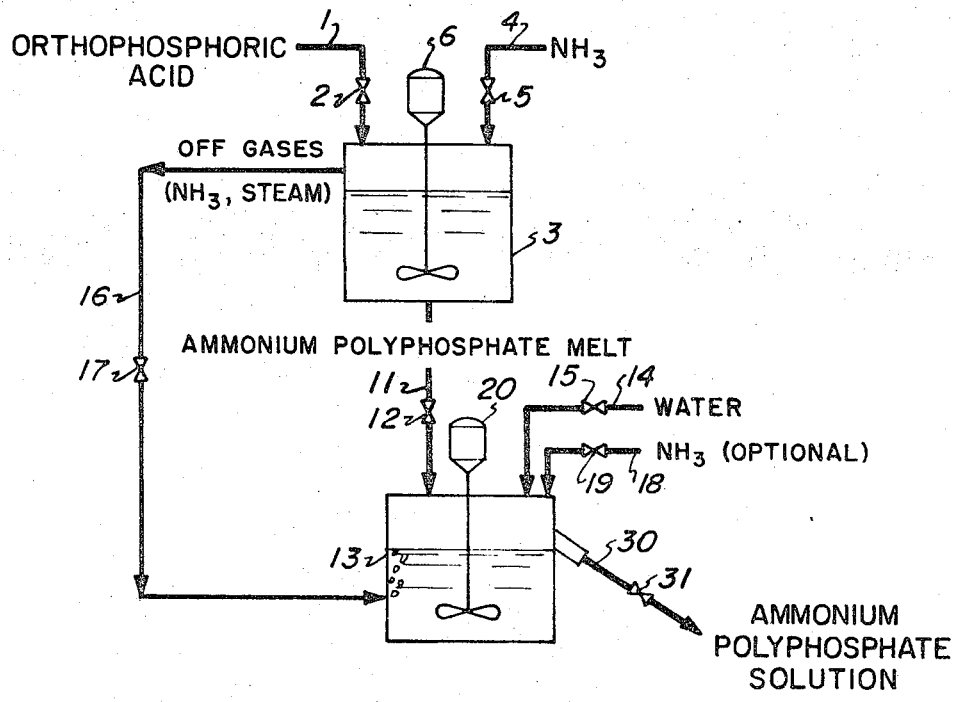
Figure 2:
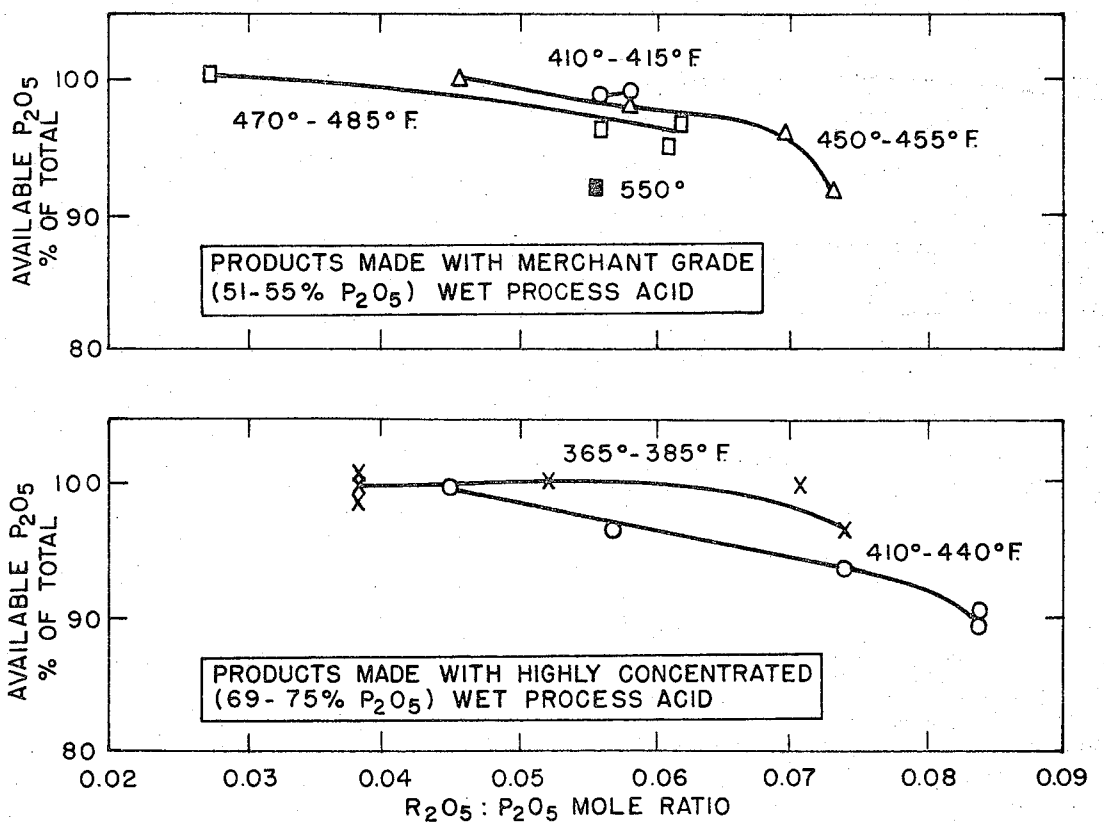

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 2, 1971

883 O.G. 12

T883,016

PRODUCTION OF AMMONIUM POLYPHOSPHATE SOLUTION

John M. Potts, Florence, Ala., assignor to Tennessee Valley Authority, a corporation of the United States

Substituated for abandoned application Ser. No. 542,779, Aug. 15, 1966. This application June 11, 1970, Ser. No. 45,475

Int. Cl. C05b *7/00, 21/00*

U.S. Cl. 71—34

2 Sheets Drawing. 19 Pages Specification

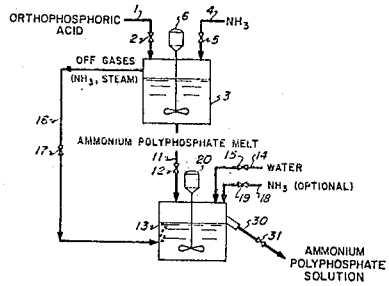

DIRECT PRODUCTION OF AMMONIUM POLYPHOSPHATE SOLUTION FROM ORTHOPHOSPHORIC ACID

A method for producing improved high-analysis ammonium polyphosphate fertilizer solutions or suspensions directly from orthophosphoric acid and anhydrous ammonia by simultaneously introducing into a vessel said orthophosphoric acid and said anhydrous ammonia; maintaining in the vessel a resulting melt of ammonium polyphosphates; continuously agitating the melt of ammonium polyphosphate and causing the intimate mixing of the incoming streams of orthophosphoric acid and anhydrous ammonia with the melt; withdrawing from the vessel a portion of the melt of ammonium polyphosphates and introducing it into a solution tank, together with a stream of aqueous medium; simultaneously introducing into the solution tank the off gases from the vessel consisting of steam and unreacted ammonia; continuously agitating the resulting fertilizer solution or suspension in the solution tank; and withdrawing a portion of the resulting solution or suspension as product, said product characterized by the fact that it contains, in addition to ammonium orthophosphate, substantial portions of ammonium pyrophosphate, ammonium tripolyphosphate, and ammonium polyphosphates more highly condensed than ammonium tripolyphosphate.

PRODUCTION OF AMMONIUM POLYPHOSPHATE SOLUTION

Filed June 11, 1970 2 Sheets-Sheet 1

DIRECT PRODUCTION OF AMMONIUM POLYPHOSPHATE SOLUTION FROM ORTHOPHOSPHORIC ACID

John M. Potts INVENTOR.

BY Robert A. Petruzela Agent

PRODUCTION OF AMMONIUM POLYPHOSPHATE SOLUTION

Filed June 11, 1970 2 Sheets-Sheet 2

EFFECT OF IMPURITY CONTENT AND MAXIMUM REACTION TEMPERATURE ON $P_2O_5$ AVAILABILITY OF AMMONIUM POLYPHOSPHATES

John M. Potts INVENTOR.

BY Robert C. Kubinski Agent